(12) United States Patent
Zhao et al.

(10) Patent No.: US 8,345,949 B2
(45) Date of Patent: Jan. 1, 2013

(54) SEQUENTIAL APPROACH FOR AUTOMATIC DEFECT RECOGNITION

(75) Inventors: Fei Zhao, Schenectady, NY (US); Robert August Kaucic, Niskayuna, NY (US); Paulo Ricardo Mendonca, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 359 days.

(21) Appl. No.: 12/720,234

(22) Filed: Mar. 9, 2010

(65) Prior Publication Data
US 2011/0222754 A1    Sep. 15, 2011

(51) Int. Cl.
*G06K 9/00*    (2006.01)
(52) U.S. Cl. ..................................... 382/141
(58) Field of Classification Search ............... 382/141
See application file for complete search history.

(56) References Cited

U.S. PATENT DOCUMENTS

| | | | | |
|---|---|---|---|---|
| 6,154,561 | A * | 11/2000 | Pratt et al. ................ | 382/141 |
| 7,421,358 | B2 | 9/2008 | Tuohy | |
| 2006/0243410 | A1 | 11/2006 | Herold | |
| 2007/0053580 | A1* | 3/2007 | Ishikawa ................ | 382/149 |
| 2009/0022391 | A1 | 1/2009 | Huotilainen | |

OTHER PUBLICATIONS

A Flisch et al., "Industrial Computed Tomography in Reverse Engineering Applications" Computerized Tomography for Industrial Applications and Image Processing in Radiology, DGZfP-Processings BB 67-CD, Mar. 15-17, 1999 pp. 45-53.
M. Simon et al., "Advanced Computed Tomography System for he Inspection of Large Aluminum Car Bodies," ECNDT 2006, Th 3.4.2, pp. 1-9.
C.R. Smith et al., "CT Inspection of Castings with Improved Calibration," 05M-498. SAE International 2004, 8 pages.
C. R. Smith, "Computed Tomography—an Inspection tool for Production—Samples in an Aluminum Foundry," 06M-197, SAE International 2005, 6 pages.
C.R. Smith et al., "Application of 450 kV Computed Tomography to Engine Blocks with Steel Liners," Materials Evaluation, vol. 65, No, 5, 2007, 5 pages.

* cited by examiner

*Primary Examiner* — Gregory J Toatley
*Assistant Examiner* — Abdullahi Nur
(74) *Attorney, Agent, or Firm* — Joseph J. Christian

(57) ABSTRACT

A method of automatic defect recognition includes receiving a initial set of inspection image data of a scanned object from a scanning machine; applying a first image analysis algorithm to this set of inspection image data; then removing from the set of inspection image data any defect-free image regions, so as to retain a set of analyzed inspection image data; applying an additional image analysis algorithm(s) to the set of analyzed inspection image data, wherein the additional algorithm(s) has a higher computational cost than the first image analysis algorithm; and based on the applying of the additional image analysis algorithm(s), removing from the first set of inspection image data a second set of defect-free image regions, thereby retaining a set of twice-analyzed inspection image data.

23 Claims, 2 Drawing Sheets

SEQUENTIAL APPROACH FOR AUTOMATIC DEFECT RECOGNITION

CROSS-REFERENCE TO RELATED APPLICATIONS

This application is related in some aspects to commonly owned patent application Ser. No. 12/693,474, entitled "SYSTEM AND METHOD FOR AUTOMATIC DEFECT RECOGNITION OF AN INSPECTION IMAGE", filed on Jan. 26, 2010, the entire contents of which are herein incorporated by reference.

BACKGROUND OF THE INVENTION

The present invention relates generally to automatic defect recognition (ADR) and more particularly to an improved methodology that employs a sequential approach to automatic defect recognition.

Automatic defect recognition (ADR) is an important component of nondestructive testing (NDT) techniques in the detection, classification or assessment of significant flaws or irregularities in manufacturing parts or objects of interest. Example of significant flaws in manufactured parts includes a defect size, shape, composition or other relevant characteristic that falls outside of the range of acceptable variability for a given structure or object of interest. Conventional ADR methods and systems call for the use of sophisticated image analysis algorithms. However, such algorithms are usually slow, and the usability of ADR systems is restricted by the ensuing trade-off between detection and computational performances. The typical solutions the industry has adopted to the problem of designing effective and efficient ADR algorithms are: accepting a limitation in effectiveness by the use of simple and fast algorithms; and adopting off-line inspection by sampling, a procedure which has much lower efficiency requirements but does not allow for inspection of every single part. Either one of these solutions can be accompanied by the use of specialized hardware to enable faster computations.

The use of image-based ADR systems in a production line often requires strict processing-time specifications. On the other hand, the typical high-performance requirements of such systems calls for the use of sophisticated, computationally-complex algorithms. Addressing the conflicting requirements of fast throughput and high detection performance at low false-alarm rates is a significant challenge.

Accordingly, there is a need for improving upon current ADR methodologies.

BRIEF DESCRIPTION

The present invention overcomes at least some of the aforementioned drawbacks by providing a methodology or approach that effectively eliminates the need for compromise by the tradeoff between defect detection or recognition and computational performance. More specifically, the present invention is directed to various methods of sequentially approaching automatic defect recognition (ADR).

Therefore, in accordance with one aspect of the invention, a method of automatic defect recognition comprises: receiving a initial set of inspection image data of a scanned object from a scanning machine; applying a first image analysis algorithm to the initial set of inspection image data; based on the applying of the first image analysis algorithm, removing from the initial set of inspection image data a first set of defect-free image regions, thereby retaining a first set of analyzed inspection image data; applying a second image analysis algorithm to the first set of analyzed inspection image data, wherein the second image analysis algorithm has a higher computational cost than the first image analysis algorithm; and based on the applying of the second image analysis algorithm, removing from the first set of inspection image data a second set of defect-free image regions, thereby retaining a second set of twice-analyzed inspection image data.

In accordance with another aspect of the invention, a method of defect recognition comprises: receiving a set of inspection image data of a scanned object from a scanning machine; iteratively applying a plurality of image analysis algorithms to the set of inspection image data, wherein the plurality of image analysis algorithms have different computational complexities, further wherein the plurality of image analysis algorithms are applied to the set of inspection image data in a cascading approach of increasing computational complexity; and successively removing from the set of inspection image data a set of defect-free image regions between iterative applications of the plurality of image analysis algorithms.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Figure 1:
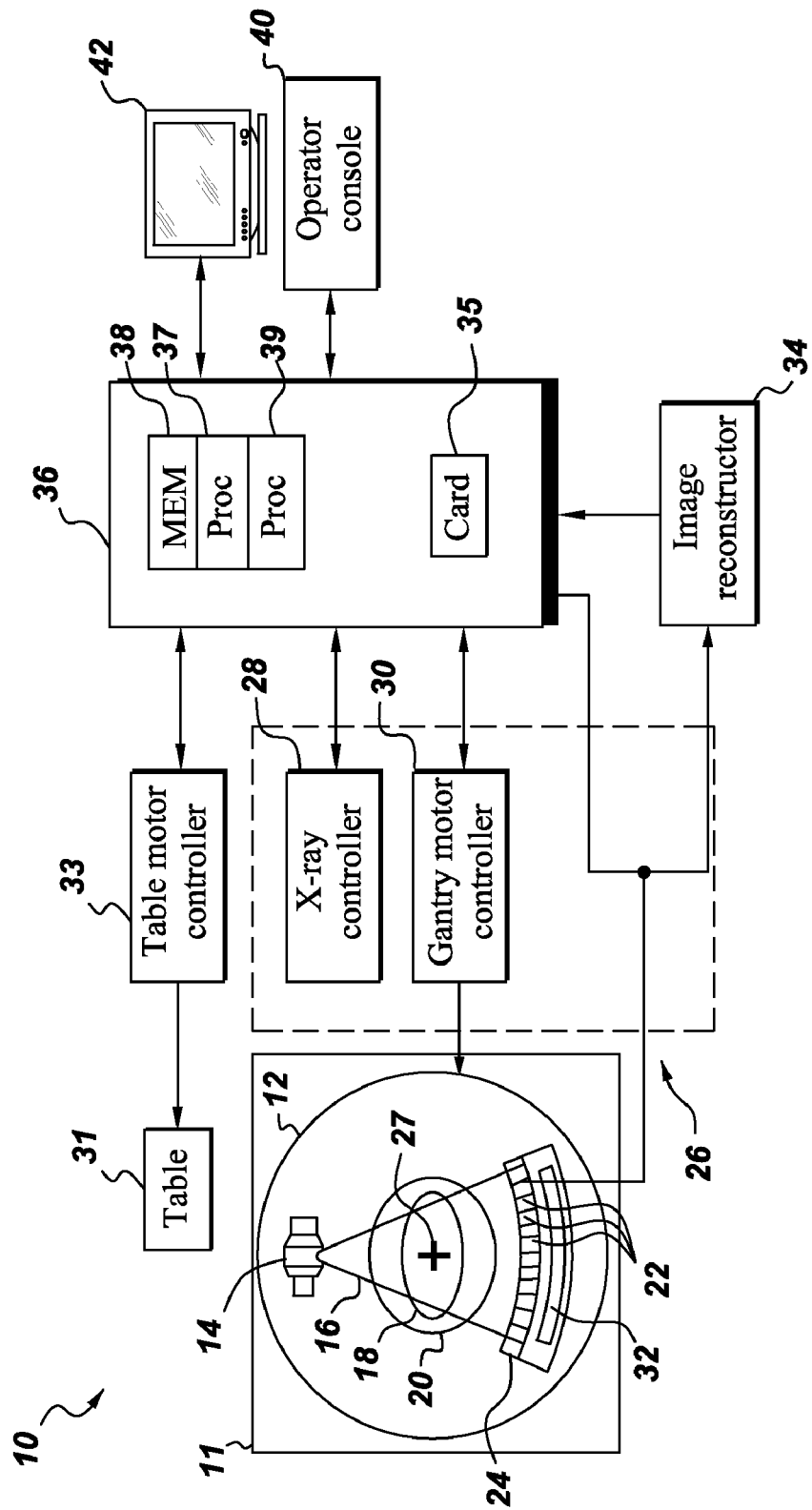
FIG. 1 is a block diagram representation of an exemplary inspection for automatic defect recognition of an object of interest, according to an embodiment of the present invention.

As discussed in detail below, embodiments of the invention are directed towards a sequential approach to automatic defect recognition (ADR). As used herein, the phrase 'defect' refers to a foreign object, foreign inclusion (e.g., sand), embedded defect, surface defect, a cavity, porosity, a bubble, a crack, a scratch, an indentation, combinations thereof, and the like. The phrase 'cavity' is a gas pocket at least partially enclosed by a gas/solid interface. If the enclosure is complete (i.e., the defective region is entirely surrounded by the solid, the cavity will be considered an 'embedded defect'. Otherwise, the cavity will be considered a type of 'surface defect'. The present invention addresses a system and methods of providing an automatic defect recognition technique, possibly in conjunction with computer assisted detection and/or diagnosis (CAD) algorithms. Such analysis may be useful in a variety of imaging contexts, such as industrial inspection system, nondestructive testing and others.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Aspects of the present invention comprise of a sequential framework for image-based automatic defect recognition (ADR) in which a series of image analysis operations may be performed in the order of their computational cost. By first executing computationally "cheaper" operations, much of the image of the inspected object can be quickly deemed non-defective, or defect-free, and removed from further consideration. The remaining regions in the image set may be processed via more sophisticated and computationally complex algorithms. This procedure is repeated so that in the end highly complex methods can be used despite their computational cost because their application is restricted to a few small image regions.

Aspects of the present invention work by progressively removing of pixels, voxels, and/or regions from consideration in a image-based defect recognition task through the initial application of a computationally inexpensive operation, followed by more complex operations applied to fewer and fewer pixels, voxels, and/or regions. While the specific nature of these operations or processing blocks may not be relevant to aspects of the invention, the processing blocks that are relevant to the particular ADR task may be executed in ascending order of computational complexity but operating over progressively fewer regions.

Aspects of the present invention allows for inline or real-time inspection of industrial parts via verification within the production line, of whether components moved along a conveyor belt (or equivalent mechanism) satisfy certain pre-established technical specifications. "Real-time" is used to indicate that the inspection process keeps up with the pace of production rather than an application-independent time limit.

FIG. 1 is an illustration of an exemplary inspection system for processing an inspection test image data corresponding to a scanned object, in accordance with aspects of the present invention. It should be noted that although the illustrated example is directed to a sequential approach to automatic defect recognition using computed tomography (CT) system, the present invention is equally applicable to other inspection modalities, non-limiting examples of which include x-ray, infrared, eddy current, ultrasound and optical. Referring to FIG. 1, the inspection system 10 includes an imaging system 11, which imaging system 11 includes a gantry 12 having an X-ray source 14 configured to emit an X-ray beam 16 responsive to electrons impinging upon a target material. In an example, the X-ray source 14 is an X-ray tube. The X-ray beam is incident upon an object 18 resulting in a transmitted X-ray beam 20 through the object 18. Non-limiting examples of the object 18 include industrial manufactured parts. The transmitted X-ray beam 20 through the object 18 is further incident upon a detector 24. In one embodiment, the detector 24 includes one or more rows or columns of detector elements 22 that produce electrical signals that represent the intensity of the transmitted beam 20. The electrical signals are acquired and processed to reconstruct an image of the features within the object 18. In a particular embodiment, the detector 24 includes a photon counting detector. In another embodiment, the detector 24 includes a dual-layered detector or energy-integrating detector.

Rotation of the gantry 12 around a center of rotation 27 and the operation of x-ray source 14 are governed by a control system 26. The control system 26 includes an x-ray controller 28 that provides power and timing signals to the X-ray source 14, a gantry motor controller 30 that controls the rotational speed and position of the gantry 12, and a table motor controller 33 that controls motion of a table 31. An image reconstructor 34 receives sampled and digitized x-ray data from a data acquisition system 32 and performs high-speed reconstruction. The image reconstructor 34 may be part of the computed tomography system 10, or may be a remote system. Further, the reconstructed image is applied as an input to a computer system 36. The computer system 36 is adapted to be in signal communication with the imaging system 11 and stores the image in a mass storage device 38.

The mass storage device 38 is a memory that is configured to store the X-ray inspection test image data corresponding to the object 18. Further, the memory may include, but is not limited to, any type and number of memory chip, magnetic storage disks, optical storage disks, mass storage devices, or any other storage device suitable for retaining information. The computer system 36 also includes a detector interface card 35 and one or more processors 37, 39 configured to process the X-ray inspection test image data corresponding to the object 18.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

In one embodiment, and as will be described in greater detail below, the processors 37, 39 are configured to receive an initial set of inspection test image data of the scanned object 18 from the imaging system 11, apply a first image analysis algorithm to the initial set of inspection image data, remove from the initial set of inspection image data a set of defect-free regions/voxels/pixels, so as to retain a first set of analyzed inspection image data, apply at least a second image analysis algorithm to the first set of analyzed inspection image data (wherein the second or more image analysis algorithm(s) are computationally more complex than the first image analysis algorithm), and based on the application of the second (or more) image analysis algorithm, remove from the first set of inspection image data a set of defect-free regions, thereby retaining a second (or more) set of twice (or more) analyzed inspection image data.

In one embodiment, the computer system 36 also receives commands and scanning parameters from an operator via a console 40, which console has some form of operator interface, such as a keyboard, mouse, voice activated controller, or any other suitable input apparatus. Non-limiting examples of input apparatus include a pointing device, a touch sensitive screen device, a tablet, a read/write drive for a magnetic disk, a read/write drive for an optical disk, a read/write drive for any other input medium, an input port for a communication link (electrical or optical), a wireless receiver. An associated display device 42 allows the operator to observe the reconstructed image and other data from the computer system 36. The display device 42 may be a CRT (cathode ray tube) screen or any other suitable display device for displaying text, graphics and a graphical user interface, for example. In one embodiment, the display device 42 is configured to display one or more defects in the X-ray inspection test image corresponding to the object 18. The console 40 and the display device 42 operate in combination to provide a graphical user interface, which graphical user interface enables a user or operator to configure and operate the radiographic inspection system 10. The detector interface card 35 provides low-level control over the image detector, buffers data read out from the detector 24, and optionally reorders image pixels to convert from read-out order to display order. The operator supplied commands and parameters are used by the computer 36 to provide control signals and information to the data acquisition system 32, the X-ray controller 28, the gantry motor controller 30, and table motor controller 33.

The object 18 may comprise any item capable of being scanned including, for example, a manufactured industrial part, equipment, a device, and combinations thereof. Types of manufactured industrial parts include, for example, a cylinder head, an engine block, a wheel, a tire, a pump, combinations thereof, and the like.

Figure 2:
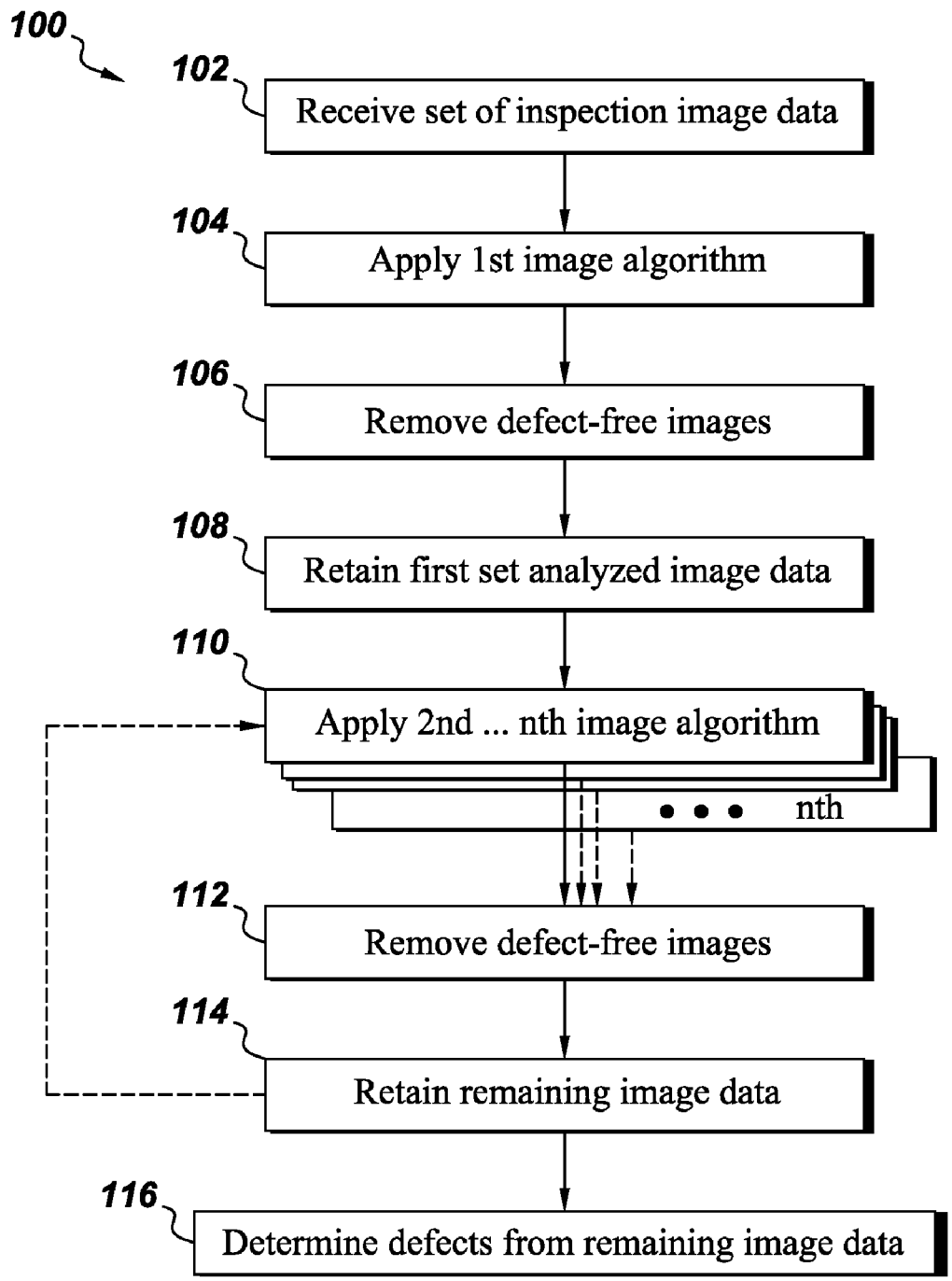
FIG. 2 is a flowchart illustrating an exemplary process of a sequential approach to automatic defect recognition, according to an embodiment of the present invention.

FIG. 2 illustrates a flowchart of an exemplary process 100 for a sequential approach for automatic defect recognition of a scanned object in accordance with an embodiment of the present invention. For certain applications, the defects may include, but are not limited to, casting and/or manufacturing defects present in a scanned object. Further, in certain applications, the scanned object may include industrial parts, such as, for example, turbine engine components, rotors, cylinder heads, and pipes. The scanned object may also include, automotive parts such as, casting wheels, engine components (e.g., blocks, etc.), and shafts. Other non-limiting exemplary applications of the present defect recognition process 100 may be in the manufacture of aircraft engine parts. During manufacturing of parts, variations are inevitable due to slight variations in the casting and processing steps. Such variations or anomalies (i.e., defects) are efficiently captured by the techniques of the present invention, which are described in one or more specific embodiments below. Referring to FIG. 2, the process 100 includes receiving an initial set of inspection image data of a scanned object from a scanning machine at step 102. In one embodiment, the set of inspection image data may be at least one two-dimensional, three-dimensional or n-dimensional inspection test image data. The 'n-dimensional' inspection test image data signifies three or more dimensional image data acquired from scanning machines. Non-limiting examples of scanning machines include a CT machine, a X-ray machine, an ultrasound machine, an optical machine or an eddy current inspection system.

In step 104, a first image analysis algorithm is applied to the initial set of inspection image data. Further, in step 106, based on the application of the first image analysis algorithm (i.e., step 104), a sub-set of defect-free regions is removed from the initial set of inspection image data, thereby retaining a first set of analyzed inspection image data at step 108.

At step 110, a second image analysis algorithm is applied to the retained first set of analyzed inspection image data. The second image analysis algorithm may have a higher computational "cost" than the first image analysis algorithm. At step 112 a set of defect-free regions is removed from the first set of analyzed inspection image data, as a result of the application of the second image analysis algorithm. At step 114, as a result of the removal of defect-free regions (step 112), a second set of twice-analyzed inspection image data is retained.

As the dotted line from step 114 back to step 110 connotes, a loop of applying additional image algorithms may be applied to the remaining image data. As shown in FIG. 2, any quantity from 2 to N image algorithms may be applied to the remaining image data. Thus, a plurality of image analysis algorithms may be iteratively applied to successive remaining sets of inspection image data. The successive image analysis algorithms may have different and increasingly computationally complexness. Ultimately, at step 116, the method determines any defects from a set of remaining image data. In this manner, this sequential and "cascading" approach of applying algorithms in an ADR setting results in a methodology with faster throughput and high detection performance at low false-alarm rates.

In another embodiment of the present invention, the application of more advanced vision algorithms follows discarding the majority of voxels (or pixels) in an image that depict defect-free regions of the inspected part with the application of more simple, computationally efficient algorithm(s). Many of the defect-free voxels (or pixels) that are not immediately flagged as such require only a small computational effort for a correct assessment. The process may be repeated and progressively fewer voxels (or pixels) are processed through steps of increased computational complexity.

Another exemplary embodiment of the present invention includes a sequence of operations targeting the detection of cavities and surface defects in aluminum castings comprises: image binarization; surface extraction via morphological operations, producing the initial candidate locations for defective regions; template matching for the detection of cavities and surface indentations; initial classification of this cavities and indentations as defective free or potentially defective; final classification of the potentially defective cavities through the use of local registration against a defect-free template image.

In accordance with aspects of the present invention, definitions of various terms are as follows. True positives are regions that the ADR system signals as defective and which are, in fact, defective as established by independent methods. False positives are regions that the ADR system signals as defective but which are, in fact, defect-free as also established by independent methods. True negatives are regions not signaled by the ADR system and which are, in fact, defect-free. False negatives are regions not signaled by the ADR system as defective but which are, in fact, defective. For a given, fixed dataset, TP, FP, TN, and FN indicate the number of true positive, false positive, true negative, and false negative detections, respectively, produced by an ADR system.

ADR tasks have specific specifications in terms of sensitivity and specificity. Thus, sensitivity, Se, is defined in Equation (1).

$$Se = TP/(TP*FN) \tag{1}$$

Specificity, Sp, is defined in Equation (2).

$$Sp = TN/(TN*FP) \tag{2}$$

Because any given processing block of the sequential framework sees only regions that have been flagged by its immediate antecessor, the specificity and sensitivity requirements of the overall system can be easily flown down to the requirements of each individual block. Defining $Se_i$ and $Sp_i$ as the sensitivity and specificity of processing block i, for i=1 to N. Equation (3) provides sensitivity, $Se_i$, as follows.

$$Se = Se_1 \times Se_2 \times \ldots \times Se_i \times \ldots \times Se_N \tag{3}$$

Similarly, Equation (4) provides specificity, $Sp_i$ as follows.

$$1 - Sp = (1 - Sp_1) \times (1 - Sp_2) \times \ldots \times (1 - Sp_i) \times \ldots \times (1 - Sp_N) \tag{4}$$

Therefore, whereas the sensitivity requirements of each block are higher than that of the overall system, the specificity requirements are significantly lower.

Equation 5 (below), which depicts a sequential approach to ADR, in accordance with aspects of the present invention, shows the per-voxel computational cost of processing block M may makes it prohibitive to apply that block to the total number of voxels N of the input image. By progressively reducing the number of voxels to be processed by subsequent block(s), the total computational "cost" can be mitigated.

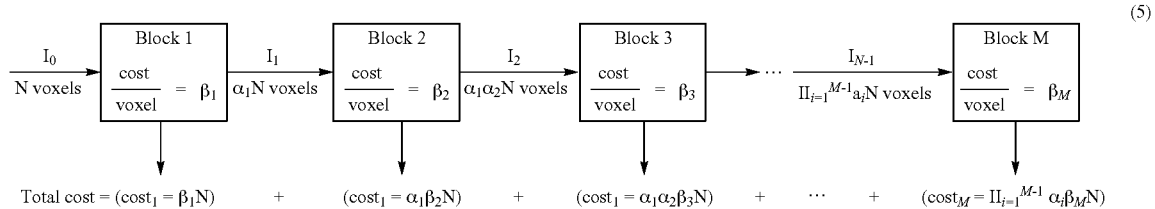

(5)

In another embodiment of the present invention, aluminum castings (e.g., cylinder heads) may be used as the scanned objects. The defects may include foreign inclusions and/or cavities. The foreign inclusions were due to high-density materials (e.g., iron) with elevated fusion point that were inadvertently mixed with the molten aluminum during the casting processing. An efficient algorithm may be applied for detecting the foreign inclusion, namely: intensity thresholding following by grouping via connected components, followed by size thresholding. CT scanners provide, for a given X-ray energy, standardized, quantitative measurements in Hounsfield units of the linear attenuation coefficient of the image object at each voxel, and therefore a threshold completely separating the voxels corresponding to aluminum ($\approx$1500 HU at 120 keV) from those corresponding to significantly more dense steel or iron ($\approx$12000 HU at 120 keV) can be readily obtained.

In another embodiment of the present invention, the method may be applied to detect embedded and/or surface defects in an aluminum casting (e.g., cylinder head) using an initial candidate-type generation. Because a gas/aluminum interface is present in both cases, the first processing block may comprise (i) thresholding at a HU value between that of air (–1000 HU) and aluminum, producing a binary mask, and (ii) subtraction of the morphological closing of the binary mask by the original mask. Small interior holes and nooks in the surface of the scanned object may be smoothed over by the morphological closing, and after subtraction by the original binary images, all that remains are cavities, enclosures and other cavity-like structures, regardless of whether those correspond to actual defects. A sphere may be selected as the structuring element of the closing operation, with a radius large enough so as to enclose most defects but not so large as to produce an excessively large quantity of candidate regions. For example, the radius chosen may be three times larger than a typical minimum "radius" of defects. The morphological operations may be performed exclusively on voxels sufficiently close to the gas/solid (e.g., aluminum) interface, which make up only a small fraction of the total number of voxels. The performance of the initial candidate generation is controlled by two parameters: (i) the threshold value used to produce the first binary mask, and (ii) the radius of the spherical structuring element used in the morphological closing operation.

In another embodiment of the present invention, the defect recognition method may employ a matched filter. Localized low-intensity signals, such as those produced by gas pockets, surrounded by high-intensity values, such as those produced by aluminum, yield strong responses when convolved with a kernel with a similar intensity profile. A cavity detection module through a matched filter with a kernel that approximates the expected profile of cavities depicted in CT is employed. The matching operation may be applied only to the few voxels that have survived the initial candidate generation. The simple shape of the cavity model allows for the use of a separable kernel for convolution, allowing for an efficient implementation. One (or more) parameter associated to defect size may be used to define the kernel used in the processing block. After performing the convolution operation, a 3D response image is obtained. To further remove defect-free voxels, the response image may be post-processed in four steps, such as (i) remove voxels with response value lower than a predetermined threshold $T_1$; group remaining voxels using connected components and calculate average response value for each group component, which now correspond to a region showing a potential defect; (iii) remove groups that have average response value lower than a threshold $T_2$; (iv) remove groups with diameter less than the maximum acceptable diameter of a cavity. The convolution kernel will, in general, produce responses that are higher on the center of the region depicting the defect than on its boundary. Setting $T_2$ at the approximate value of the response at the boundary of depicted defects improves the estimation of cavity size required in step (iv).

In another embodiment of the present invention, the defect recognition method employs a curvature-based detection methodology. In order to distinguish between man-made cavities and true cavities, it has been observed that man-made cavities tend to be tube-like surface cavities, while natural (true) defects are more likely to be blob-like structures. As such, an aspect of the present invention may employ curvature- or second-derivative-based operators. Let I(x) be the intensity value in Hounsfield units of the CT volume at voxel x. Then, at x, the principal curvatures $\kappa_{min}$ and $\kappa_{max}$ of the isosurface defined by $\{y \in \mathbb{R}^3 \mid I(y)=I(x)\}$. This operation may be carried out for all voxels in the regions of potential defects indicated by the output of the template matching algorithm. Once $\kappa_{min}$ and $\kappa_{max}$ have been computed a shape index s, given by $$s = \frac{2}{\Pi} \arctan \frac{\kappa_{min} + \kappa_{min}}{\kappa_{min} - \kappa_{min}}$$

may be used to discriminate between tube-like and blob-like structures. A geometrically perfect tube, i.e., a structure with zero curvature along one direction and arbitrary positive curvature along another direction has $s=-\frac{1}{2}$, whereas for a perfect spherical cup $s=1$, and a threshold discriminating the two can be easily obtained. The curvature responses at each voxel are grouped via connected components and a size threshold is applied to eliminate detections that are too small, according to the part specifications, to be considered significant.

After any combination of the aforementioned methodologies for defect recognition are used, a final discrimination technique may be used to distinguish between true defects and false defects with the aid of specific information about the object under inspection. Registration-based methods are an effective mechanism for the introduction of such information or domain knowledge. Thus, only a few regions of interest being now considered as the location(s) of potential defects. The local registration of these few regions against a defect-free template is therefore a computationally efficient procedure. An local-registration algorithm that may be employed comprises: (i) extraction of a fixed-sized region of interest (ROI) centered at the location of the potential defects provided by the curvature-based detector; ii) rigid registration of this ROI to a defect-free template; (iii) intensity thresholding and grouping of the difference between the template and the registered ROI; (iv) size thresholding of the grouped regions. The regions which remain after the local-registration algorithm are potential defects presented as the final output of the ADR system.

A technical advantage of the algorithm is in freeing the designer of an ADR system from having to relinquish the use of sophisticated algorithms with high detection performance due to a concern with excessive computational complexity. Aspects of the present invention are flexible in which the specific processing blocks of the ADR system are irrelevant: the order in which each block is executed is simply prescribed, as well as each block's specificity and sensitivity requirements as a function of the overall requirements of the overall ADR system. Additionally, aspects of the present invention can be adapted for use with either a reference-based or a reference-free system, which are terms describing the use or not of a reference, defect-free template image in the ADR task.

Under aspects of the present invention, the method may be applied to a pre-existing scanning system. In this manner, the method could be even applied remotely from the manufacturing site. For example, the inspection image data could be received at a computer that is separate from the imaging system. In an alternative embodiment, the method may include further acquiring the inspection image data.

Various algorithms may be used under aspects of the present invention. The algorithms may be reference-free or reference-based. Various reference-free algorithms that may be used include, for example, Gabor filtering, local shape analysis, reconstruction from wavelet maxima, median filtering, binarization, and the like. Similarly, various reference-based algorithms that may be used include, for example, grey scale differences after registration, curvature differences after registration.

Advantageously, the present technique provides for a number of commercial advantages over current ADR systems including amenability to inline use (i.e., use of ADR within a production line without disturbing production schedules); and, ease of implementation within legacy systems by, for example, taking the whole of existing systems as a single processing block, by use as a pre-processing system chiefly aimed at reducing computational cost, or by use as a post-processing system for reduction of false alarms.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of automatic defect recognition comprising:
   receiving a initial set of inspection image data of a scanned object from a scanning machine;
   specifying at least one of: sensitivity and specificity associated with the defect recognition;
   applying a first image analysis algorithm to the initial set of inspection image data;
   based on the applying of the first image analysis algorithm, removing from the initial set of inspection image data a first set of defect-free image regions in accordance with the at least one of: sensitivity and specificity, further reducing number of voxels to be processed in subsequent image analysis and thereby retaining a first set of analyzed inspection image data;
   applying a second image analysis algorithm to the first set of analyzed inspection image data, wherein the second image analysis algorithm has a higher computational cost than the first image analysis algorithm; and
   based on the applying of the second image analysis algorithm, removing from the first set of inspection image data a second set of defect-free image regions in accordance with the at least one of: sensitivity and specificity, further reducing number of voxels to be processed in a subsequent image analysis and thereby retaining a second set of twice-analyzed inspection image data;
   wherein the first and the second image analysis algorithm comprise a sequential and cascaded approach.

2. The method of claim 1 wherein the scanned object comprises one of a manufactured industrial part, equipment, a device, and combinations thereof.

3. The method of claim 2, wherein the manufactured industrial part comprises one of a cylinder head, an engine block, a wheel, a tire, a pump, and combinations thereof.

4. The method of claim 1 further comprising acquiring the initial set of inspection image data of the scanned object with the scanning machine.

5. The method of claim 1, wherein the first and the second image analysis algorithm comprise a reference-free algorithm or a referenced-based algorithm.

6. The method of claim 5, wherein the reference-based algorithm comprises at least one of grey scale differences after registration and curvature differences after registration.

7. The method of claim 5, wherein the reference-free algorithm comprises at least one of Gabor filtering, local shape analysis, reconstruction from wavelet maxima, median filtering, and a binarization algorithm.

8. The method of claim 1, further comprising determining from the twice-analyzed inspection image data at least one a subset of image regions having a defect.

9. The method of claim 8, wherein the defect comprises one of porosity, a bubble, a void, sand, a crack, an inclusion, a scratch, an indentation, and combinations thereof.

10. The method of claim 1, wherein the scanning machine comprises one of a MRI machine, a CT machine, an X-ray machine, an ultrasound machine, an optical machine, and combinations thereof.

11. The method of claim 1, wherein the image regions comprises one of pixels, voxels, and whole images/volumes.

12. The method of claim 1, further comprising:
- applying a third image analysis algorithm to the twice-analyzed inspection image data, wherein the third image analysis algorithm has a higher computational cost than the second image analysis algorithm; and
- based on the applying of the third image analysis algorithm, removing from the twice-analyzed inspection image data a third set of defect-free image regions, thereby retaining a third set of thrice-analyzed inspection image data.

13. The method of claim 1, wherein the specifying comprises specifying at least one of: false alarm rate, true positive, true negative, false positive and false negative values associated with the defect recognition.

14. The method of claim 13, wherein the specifying further comprises distinguishing between the true positive and the false positive values.

15. The method of claim 14, wherein the distinguishing comprises registration based algorithms.

16. The method of claim 1, wherein the first and the second image analysis algorithm comprise a curvature based detection algorithm.

17. The method of claim 1, wherein the first and the second image analysis comprise employing a matched filter.

18. The method of claim 1, wherein the first and the second image analysis comprise at least one of: inline, remote, pre-processing and post-processing analysis.

19. A method of defect recognition comprising:
- receiving a set of inspection image data of a scanned object from a scanning machine;
- specifying at least one of: sensitivity and specificity associated with the defect recognition;
- iteratively applying a plurality of image analysis algorithms to the set of inspection image data, wherein the plurality of image analysis algorithms have different computational complexities, further wherein the plurality of image analysis algorithms are applied to the set of inspection image data in a sequential and cascading approach of increasing computational complexity; and
- successively removing from the set of inspection image data a set of defect-free image regions in accordance with the at least one of: sensitivity and specificity between iterative applications of the plurality of image analysis algorithms.

20. The method of claim 19, wherein the specifying comprises specifying at least one of: false alarm rate, true positive, true negative, false positive and false negative values associated with the defect recognition.

21. The method of claim 20, wherein the specifying further comprises distinguishing between the true positive and the false positive values.

22. The method of claim 21, wherein the distinguishing comprises registration based algorithms.

23. The method of claim 19, wherein the first and the second image analysis comprise at least one of: inline, remote, pre-processing and post-processing analysis.

\* \* \* \* \*

UNITED STATES PATENT AND TRADEMARK OFFICE
CERTIFICATE OF CORRECTION

PATENT NO. : 8,345,949 B2
APPLICATION NO. : 12/720234
DATED : January 1, 2013
INVENTOR(S) : Zhao et al.

Page 1 of 1

It is certified that error appears in the above-identified patent and that said Letters Patent is hereby corrected as shown below:

On the Title Page, in Item (56), under "OTHER PUBLICATIONS", in Column 2, Line 3, delete "he" and insert -- the --, therefor.

On the Title Page, in Item (56), under "OTHER PUBLICATIONS", in Column 2, Line 4, delete "Th 3.4.2," and insert -- Th.3.4.2, --, therefor.

In Column 6, Line 55, delete "$Sp_i$," and insert -- $Sp_i$, --, therefor.

Signed and Sealed this
Fifth Day of March, 2013

Teresa Stanek Rea
*Acting Director of the United States Patent and Trademark Office*